United States Patent
Takahashi

(10) Patent No.: US 12,448,299 B2
(45) Date of Patent: Oct. 21, 2025

(54) METHOD FOR PRODUCING RARE EARTH CARBONATE FINE PARTICLES AND A RARE EARTH CARBONATE FINE PARTICLE

(71) Applicant: SHIN-ETSU CHEMICAL CO., LTD., Tokyo (JP)

(72) Inventor: Mitsuhito Takahashi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 974 days.

(21) Appl. No.: 17/612,588

(22) PCT Filed: Apr. 16, 2020

(86) PCT No.: PCT/JP2020/016694
§ 371 (c)(1),
(2) Date: Nov. 19, 2021

(87) PCT Pub. No.: WO2020/246148
PCT Pub. Date: Dec. 10, 2020

(65) Prior Publication Data
US 2022/0234907 A1    Jul. 28, 2022

(30) Foreign Application Priority Data

Jun. 5, 2019  (JP) ................................ 2019-105267

(51) Int. Cl.
*C01F 17/247*     (2020.01)
*B82Y 30/00*      (2011.01)
*B82Y 40/00*      (2011.01)

(52) U.S. Cl.
CPC ............. *C01F 17/247* (2020.01); *B82Y 30/00* (2013.01); *B82Y 40/00* (2013.01); *C01P 2004/64* (2013.01)

(58) Field of Classification Search
CPC .................................................. C01F 17/247
See application file for complete search history.

(56) References Cited

U.S. PATENT DOCUMENTS

| | | | |
|---|---|---|---|
| 5,015,452 A | 5/1991 | Matijevic | |
| 5,413,736 A | 5/1995 | Nishisu et al. | |
| 5,439,656 A | 8/1995 | Kimura et al. | |
| 6,133,194 A | 10/2000 | Cuif et al. | |
| 2007/0093183 A1 | 4/2007 | Yoshikawa et al. | |
| 2011/0210282 A1 | 9/2011 | Foley | |
| 2013/0090511 A1 | 4/2013 | Soultanidis et al. | |
| 2014/0154155 A1* | 6/2014 | Wyrsta ..................... | C22B 3/44 423/352 |

FOREIGN PATENT DOCUMENTS

| | | |
|---|---|---|
| CN | 101291778 A | 10/2008 |
| JP | S58-172224 A | 10/1983 |
| JP | S62-213837 A | 9/1987 |
| JP | H02-501062 A | 4/1990 |
| JP | H05-254830 A | 10/1993 |
| JP | H06-271316 A | 9/1994 |
| JP | H06-305726 A | 11/1994 |
| JP | H10-139426 A | 5/1998 |
| JP | 2000-239019 A | 9/2000 |
| JP | 2001-524918 A | 12/2001 |
| JP | 2011-042512 A | 3/2011 |
| JP | 2016-094317 A | 5/2016 |
| WO | 2014/203179 A2 | 12/2014 |

OTHER PUBLICATIONS

Jul. 20, 2023 Office Action issued in Chinese Patent Application No. 202080040294.4.
Chen, H. et al., "Preparation of nano-sized lanthanum oxide by ultra sonic-homogeneous precipitaton method," Inorganic Chemicals Industry, Oct. 2008, pp. 18-20.
Feb. 15, 2023 Office Action issued in Chinese Patent Application No. 202080040294.4.
Jun. 30, 2020 International Search Report issued in International Patent Application No. PCT/2020/016694.
Dec. 7, 2021 International Preliminary Report on Patentability issued in International Patent Application No. PCT/JP2020/016694.

* cited by examiner

*Primary Examiner* — Stuart L Hendrickson
(74) *Attorney, Agent, or Firm* — Oliff PLC

(57) ABSTRACT

A method for producing rare earth carbonate fine particles, including, forming a reaction solution in which an alkyldimethylamine oxide compound having a structure represented by the following formula (1) or a methylmorpholine oxide compound is added to an aqueous solution containing rare earth ion and an excess amount of urea with respect to the rare earth ion, such that the compound is added in an addition amount of 10 to 200 mol % relative to the rare earth ion, and subjecting the reaction solution to hydrothermal treatment to produce rare earth carbonate fine particles. This provides a method for producing rare earth carbonate fine particles of submicron or less and having excellent dispersibility.

[Chemical 1]

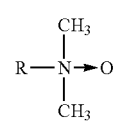

(1)

wherein R represents an alkyl group of C1 to C14.

6 Claims, No Drawings

METHOD FOR PRODUCING RARE EARTH CARBONATE FINE PARTICLES AND A RARE EARTH CARBONATE FINE PARTICLE

TECHNICAL FIELD

The present invention relates to a method for producing rare earth carbonate fine particles and a rare earth carbonate fine particle.

BACKGROUND ART

Conventionally, as a method for producing rare earth oxide particles, an alkali compound such as ammonium carbonate, ammonium hydrogen carbonate or urea is added to an aqueous solution of nitrate or hydrochloride of a rare earth element, and a carbonate of the rare earth element is produced by hydrothermal treatment of the solution. Then, it is filtered, washed, and dried to obtain carbonate of the rare earth element, after that the carbonate is calcined to obtain an oxide of the rare earth element (Patent Document 1).

In Patent Document 2, method for producing a fine powder of a rare earth oxide spherical fine particles having excellent dispersibility is disclosed. The method comprises mixing an aqueous solution containing a rare earth element and an aqueous solution containing urea, adding a dispersant to the mixed solution, and then calcining the particles produced by hydrothermal treatment of the mixed solution.

Further, in Patent Document 3, a production method for obtaining yttria spherical fine particles is disclosed. The method comprises an aqueous urea solution is added to an aqueous solution of yttrium mineral salt, then heated to a temperature below the boiling point while maintaining a temperature below the boiling point to precipitate a carbonate of yttrium, and the precipitated carbonate is separated by solid-liquid separation process followed by calcining to obtain the yttria spherical fine particles.

CITATION LIST

Patent Literature

Patent Document 1: JP H06-305726 A
Patent Document 2: JP H05-254830 A
Patent Document 3: JP H10-139426 A

SUMMARY OF INVENTION

Technical Problem

However, the rare earth oxide produced by the production method described in Patent Document 1 has a problem that average particle size is large and dispersibility is remarkably inferior.

Further, in the hydrothermal reaction for synthesizing rare earth oxide particles, even if reaction conditions such as amount of raw material of the rare earth salt to be added, reaction temperature, and reaction time are controlled, the rare earth oxide fine particles of submicron or less having excellent dispersibility has been difficult to stably produce.

The present invention has been made in view of such a problem, and an object of the present invention is to provide a production method for stably producing rare earth carbonate fine particles of submicron or less and having excellent dispersibility, and a rare earth carbonate fine particle.

Solution to Problem

The present invention has been made to achieve the above object, and is a method for producing rare earth carbonate fine particles, comprising:

forming a reaction solution in which an alkyldimethylamine oxide compound having a structure represented by the following formula (1) or a methylmorpholine oxide compound is added to an aqueous solution containing rare earth ion and an excess amount of urea with respect to the rare earth ion, such that the compound is added in an addition amount of 10 to 200 mol % relative to the rare earth ion; and subjecting the reaction solution to hydrothermal treatment to produce rare earth carbonate fine particles.

[Chemical formula 1]

(1)

Wherein R represents an alkyl group of C1 to C14.

According to such a method for producing rare earth carbonate fine particles, it is possible to stably produce rare earth carbonate fine particles of submicron or less having good dispersibility with good controllability, by an effect that an alkyldimethylamine oxide compound having a structure represented by the above formula (1) or methylmorpholine oxide selectively adsorb to reaction points where particles grow in particle growth reaction process to appropriately suppress the particle growth and particle agglomeration in the particle growth process in hydrothermal reaction for growing and precipitating rare earth carbonate.

At this time, the method for producing rare earth carbonate fine particles comprises the rare earth carbonate fine particles are cerium or a composite particle of cerium and another rare earth element. Further, the method for producing rare earth carbonate fine particles comprises average particle size of the rare earth carbonate fine particles is 10 nm to 200 nm.

This makes it possible to produce rare earth carbonate fine particles having a wider range of uses (applicable range).

Further, it is possible to provide a rare earth carbonate fine particle having an average particle size of 10 nm to 200 nm, and an alkyldimethylamine oxide compound having a structure represented by the following formula (1) or a methylmorpholine oxide compound is adsorbed on a surface of the rare earth carbonate fine particle.

[Chemical formula 2]

(1)

Wherein R represents an alkyl group of C1 to C14.

As a result, the rare earth carbonate fine particle having a particle size of submicron or less, excellent dispersibility, and a wide range of application can be obtained.

At this time, the rare earth carbonate fine particle can be cerium or a composite particle of cerium and another rare earth element.

As a result, it has a wider range of applications (applicable range).

Advantageous Effects of Invention

As described above, according to the method for producing rare earth carbonate fine particles of the present invention, it is possible to stably produce rare earth carbonate fine particles of submicron or less having good dispersibility with good controllability. Further, according to the rare earth carbonate fine particle of the present invention, the rare earth carbonate fine particle of submicron or less having a wide range of uses (applicable range) and having good dispersibility is obtained.

DESCRIPTION OF EMBODIMENTS

Hereinafter, the present invention will be described in detail, but the present invention is not limited thereto.

As described above, there has been a demand for a production method for stably producing rare earth carbonate fine particles of submicron or less having excellent dispersibility.

As a result of diligent studies on the above problems, the present inventors have found that rare earth carbonate fine particles of submicron or less having excellent dispersibility can be stably produced with good controllability by a method for producing rare earth carbonate fine particles, comprising, forming a reaction solution in which an alkyldimethylamine oxide compound having a structure represented by the following formula (1) or a methylmorpholine oxide compound is added to an aqueous solution containing rare earth ion and an excess amount of urea with respect to the rare earth ion, such that the compound is added in an addition amount of 10 to 200 mol % relative to the rare earth ion, and subjecting the reaction solution to hydrothermal treatment to produce rare earth carbonate fine particles and completed the present invention.

[Chemical formula 3]

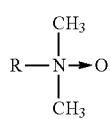

(1)

Wherein R represents an alkyl group of C1 to C14.

Further, as described above, a rare earth carbonate fine particle of submicron or less having excellent dispersibility and having a wide range of uses (applicable range) has been required.

As a result of diligent studies on the above problems, the present inventors have found that the rare earth carbonate fine particle having an average particle diameter of 10 nm to 200 nm, and an alkyldimethylamine oxide compound having a structure represented by the following formula (1) or a methylmorpholine oxide compound is adsorbed on a surface of the rare earth carbonate fine particle has excellent dispersibility and has a wide range of uses (applicable range) and have completed the invention.

[Chemical formula 4]

(1)

Wherein R represents an alkyl group of C1 to C14.

As described above, the method for producing rare earth carbonate fine particles according to the present invention is characterized in that an aqueous solution containing rare earth ions and an aqueous solution containing urea are mixed, and a specific amount of a compound having a specific structure is added to the rare earth ions. Further, the rare earth carbonate fine particle according to the present invention has a predetermined average particle size, in which an alkyldimethylamine oxide compound having a structure represented by the above formula (1) or a methylmorpholine oxide compound is adsorbed on the surface thereof.

By using the rare earth carbonate fine particles according to the present invention as polishing particles of various substrate materials used for semiconductor-related electronic materials for state of the art applications, it is possible to suppress the occurrence of defects such as scratches due to polishing.

Hereinafter, the rare earth carbonate fine particle according to the present invention, each component used in the method for producing the rare earth carbonate fine particles, and a component that can be arbitrarily added will be described in more detail.

(Rare Earth Carbonate Fine Particles)

The average particle size of the rare earth carbonate fine particles according to the present invention is in the range of 10 nm to 200 nm. Such rare earth carbonate fine particles are excellent in dispersibility, and can obtain good properties when used as various polishing particles, and can easily obtain properties required in industrial fields other than polishing applications. In particular, it is more preferable if it is in the range of 20 nm to 150 nm.

Further, the rare earth carbonate fine particles according to the present invention have an alkyldimethylamine oxide compound having a structure represented by the above formula (1) or a methylmorpholine oxide compound adsorbed on the surface thereof. Such substances are rare earth carbonate fine particles of submicron or less having good dispersibility, and by setting the average particle size in the above range, they are excellent in dispersibility and have a wide range of uses (applicable range).

The rare earth carbonate fine particle according to the present invention may be cerium or composite particle of cerium and other rare earth elements. If it is such a thing, it will have a wider range of uses (applicable range).

The average particle size of the produced rare earth carbonate fine particles was measured using a particle size measurement system (ELSZ-2000S, manufactured by Otsuka Electronics co., Ltd.). This particle size measurement system uses a dynamic light scattering method (photon correlation method) as a particle size measurement principle. Since the particles in the solution have a Brownian motion depending on the particle size, the scattered light obtained when the particles are irradiated with light shows quick fluctuations for small particles and slow fluctuations for large particles. By analyzing this fluctuation by the photon correlation method, the particle size (average particle size) and particle size distribution can be obtained.

(Manufacturing Method of Rare Earth Carbonate Fine Particles)

First, an aqueous solution containing rare earth ions and an excess amount of urea with respect to the rare earth ions is prepared. The method for producing this aqueous solution is not particularly limited, and for example, it can be obtained by mixing an aqueous solution containing rare earth ions and an aqueous solution containing urea.

In this case, for example, an aqueous solution containing rare earth ions can be used as an aqueous solution of water-soluble rare earth salts such as chlorides, nitrates and sulfates of rare earth elements, and the rare earth salts including cerium nitrate, cerium chloride, yttrium nitrate and yttrium chloride can be preferably used. The rare earth ion concentration of the rare earth salt aqueous solution can be, for example, in the range of 0.01 mol·dm$^{-3}$ to 0.1 mol·dm$^{-3}$.

As the aqueous solution containing urea, urea or a urea-based compound can be used, and the aqueous solution can be mixed with ultrapure water and adjusted to an appropriate concentration before use. Here, as the urea compound, dimethylacetyl urea, benzenesulfonylurea, trimethylurea, tetraethylurea, tetramethylurea, triphenylurea, tetraphenylurea and the like can also be used.

The urea concentration is not particularly limited as long as it is an excess amount with respect to the rare earth ion concentration to be mixed, but it is preferably 20 to 50 times of the rare earth ion concentration.

Further, examples of the compound having a structure represented by the above formula (1) added to an aqueous solution containing rare earth ions and an excess amount of urea with respect to the rare earth ions include trimethylamine oxide, lauryldimethylamine oxide, and myristyldimethylamine oxide or the like can be preferably used, and trimethylamine oxide is particularly preferable because it has excellent water solubility. The amount to be added is 10 to 200 mol % with respect to the rare earth ions in the mixed solution, but it is more preferable to add it at a ratio of 50 to 100 mol %. If the amount added is less than 10 mol %, the effect of suppressing particle growth is reduced, it is difficult to obtain particles of submicron or smaller, and dispersibility may be deteriorated. Further, if the addition amount is more than 200 mol %, the reaction suppressing effect becomes too strong, the particle growth reaction becomes difficult to proceed, and the productivity may deteriorate in that the reaction time becomes long, which is not suitable for a practical production (manufacturing).

In this way, a reaction solution comprising the rare earth ion, the excess amount of urea with respect to the rare earth ion, and the alkyldimethylamine oxide compound having the structure represented by the above formula (1) or methylmorpholine oxide compound are added so as to have an addition amount of 10 to 200 mol % to the rare earth ion can be prepared. It is also possible to include additives other than those described above in this reaction solution.

By setting the rare earth ion concentration and urea concentration in the reaction solution and the addition amount of the alkyldimethylamine oxide compound having the structure represented by the above formula (1) or methylmorpholine oxide compound within the above range, it is possible to produce a reaction solution capable of producing fine particles having a particle size of submicron or less and having excellent uniform dispersibility.

Next, the reaction solution is transferred to a reaction vessel, stirred, and hydrothermally treated at a predetermined temperature. The conditions of this hydrothermal treatment are not particularly limited, but the reaction temperature can be 100° C. or lower, for example, 80° C. or higher and 100° C. or lower, and the reaction time can be 10 minutes or longer, for example, 10 minutes to 60 minutes. The rate of temperature rising from room temperature to the reaction temperature can be 3° C. to 6° C. per minute, preferably 4° C. per minute.

After the hydrothermal treatment is completed, the reaction solution is cooled to room temperature. Through such a process, a solution in which rare earth carbonate fine particles having an average particle size of 10 nm to 200 nm can be produced. After that, the rare earth carbonate fine particles can be obtained by separating the solution by an appropriate method.

As described above, rare earth carbonate fine particles having an average particle size of submicron or less having excellent dispersibility can be manufactured stably with high controllability by hydrothermally treating the reaction solution comprising the rare earth ion, the excess amount of urea with respect to the rare earth ion, and the alkyldimethylamine oxide compound having the structure represented by the above formula (1) or methylmorpholine oxide compound is added so as to have an addition amount of 10 to 200 mol % the rare earth ion.

EXAMPLE

Hereinafter, the present invention will be specifically described with reference to Examples and Comparative Examples, but this does not limit the present invention.

In the evaluation of the dispersibility of the rare earth carbonate fine particles in the Examples and Comparative Examples shown below, the produced particles were dispersed in water, let to stand for 24 hours, and then the presence or absence of liquid separation due to sedimentation of the particles was checked. Then, it was judged that the dispersibility was good if the liquid separation did not occur.

Example 1

15 ml of 1 mol·dm$^{-3}$ cerium nitrate solution was diluted with pure water to prepare 400 g of cerium solution. Subsequently, 60 ml of a urea solution of 5 mol·dm$^{-3}$ was diluted with 600 g of pure water to prepare a urea solution, which was mixed with a cerium solution to prepare a 1000 g mixed solution. A 50 mol % amount of trimethylamine oxide (manufactured by Tokyo Chemical Industry Co., Ltd.) with respect to cerium ions was added to the prepared mixed solution to prepare a reaction solution. The prepared reaction solution was put into a separable flask, and the reaction solution was heated at 90° C. for 30 minutes to precipitate particles in the reaction solution. The precipitated particles were collected by a centrifuge and dried by heating at 80° C. for 2 hours to obtain cerium carbonate particles. The average particle size of the obtained cerium carbonate particles was 60 nm. Further, after 5 g of the produced particles were dispersed in 100 ml of pure water and let to stand for 24 hours, liquid separation was checked. As a result, there was no separation and the dispersibility was good.

Example 2

Cerium carbonate particles were produced in the same procedure as in Example 1 except that lauryldimethylamine oxide was added instead of trimethylamine oxide. The average particle size of the obtained cerium carbonate particles was 65 nm. Further, after 5 g of the produced particles were dispersed in 100 ml of pure water and let to stand for 24 hours, liquid separation was checked. As a result, there was no separation and the dispersibility was good.

Example 3

Cerium carbonate particles were produced in the same procedure as in Example 1 except that the amount of trimethylamine oxide added was 10 mol % with respect to cerium ions. The average particle size of the obtained cerium carbonate particles was 90 nm. Further, after 5 g of the produced particles were dispersed in 100 ml of pure water and let to stand for 24 hours, liquid separation was checked. As a result, there was no separation and the dispersibility was good.

Example 4

Cerium carbonate particles were produced in the same procedure as in Example 1 except that the amount of trimethylamine oxide added was 100 mol % with respect to cerium ions. The average particle size of the obtained cerium carbonate particles was 35 nm. Further, after 5 g of the produced particles were dispersed in 100 ml of pure water and let to stand for 24 hours, liquid separation was checked. As a result, there was no separation and the dispersibility was good.

Example 5

Cerium carbonate particles were produced in the same procedure as in Example 1 except that the amount of trimethylamine oxide added was 200 mol % with respect to cerium ions. The average particle size of the obtained cerium carbonate particles was 10 nm. Further, after 5 g of the produced particles were dispersed in 100 ml of pure water and let to stand for 24 hours, liquid separation was checked. As a result, there was no separation and the dispersibility was good.

Example 6

Cerium carbonate particles were produced in the same procedure as in Example 1 except that N-methylmorpholine oxide was added instead of trimethylamine oxide. The average particle size of the obtained cerium carbonate particles was 70 nm. Further, after 5 g of the produced particles were dispersed in 100 ml of pure water and let to stand for 24 hours, liquid separation was checked. As a result, there was no separation and the dispersibility was good.

Comparative Example 1

Cerium carbonate particles were produced in the same procedure as in Example 1 except that the amount of trimethylamine oxide added was 5 mol % with respect to cerium ions. The average particle size of the obtained cerium carbonate particles was 220 nm. After 5 g of the produced particles were dispersed in 100 ml of pure water and let to stand for 24 hours, liquid separation was checked. As a result, the liquid was separated by sedimentation of the particles.

Comparative Example 2

Cerium carbonate particles were produced in the same procedure as in Example 1 except that the amount of trimethylamine oxide added was 210 mol % with respect to cerium ions. The average particle size of the obtained cerium carbonate particles was 8 nm. After 5 g of the produced particles were dispersed in 100 ml of pure water and let to stand for 24 hours, liquid separation was checked. As a result, separation was not confirmed.

Comparative Example 3

Cerium carbonate particles were produced in the same procedure as in Example 1 except that trimethylamine oxide was not added. The average particle size of the obtained cerium carbonate particles was 600 nm. After 5 g of the produced particles were dispersed in 100 ml of pure water and let to stand for 24 hours, liquid separation was checked. As a result, the liquid was separated by sedimentation of the particles.

Comparative Example 4

Cerium carbonate particles were produced in the same procedure as in Example 1 except that 50 mol % to cerium ions of trimethylamine hydrochloride was added instead of trimethylamine oxide. The average particle size of the obtained cerium carbonate particles was 550 nm. After 5 g of the produced particles were dispersed in 100 ml of pure water and let to stand for 24 hours, liquid separation was checked. As a result, the liquid was separated by sedimentation of the particles.

Comparative Example 5

Cerium carbonate particles were produced in the same procedure as in Example 1 except that 50 mol % to cerium ions of pyridine oxide was added instead of trimethylamine oxide. The average particle size of the obtained cerium carbonate particles was 500 nm. After 5 g of the produced particles were dispersed in 100 ml of pure water and let to stand for 24 hours, liquid separation was checked. As a result, the liquid was separated by sedimentation of the particles.

The results of Examples 1 to 6 and Comparative Examples 1 to 5 are shown in Table 1.

TABLE 1

| | Additives | Added amount (mol %) | Particle size (nm) | Dispersibility |
|---|---|---|---|---|
| Example 1 | Trimethylamine oxide | 50 | 60 | No separation |
| Example 2 | Lauryldimethyl-amine oxide | 50 | 65 | No separation |
| Example 3 | Trimethylamine oxide | 10 | 90 | No separation |
| Example 4 | Trimethylamine oxide | 100 | 35 | No separation |
| Example 5 | Trimethylamine oxide | 200 | 10 | No separation |
| Example 6 | N-methylmor-pholine oxide | 50 | 70 | No separation |
| Comparative Example 1 | Trimethylamine oxide | 5 | 220 | Separation |
| Comparative Example 2 | Trimethylamine oxide | 210 | 8 | No separation |

TABLE 1-continued

| | Additives | Added amount (mol %) | Particle size (nm) | Dispersibility |
|---|---|---|---|---|
| Comparative Example 3 | — | — | 600 | Separation |
| Comparative Example 4 | Trimethylamine hydrochloride | 50 | 550 | Separation |
| Comparative Example 5 | Pyridine oxide | 50 | 500 | Separation |

In Examples 1 to 6, if a predetermined amount of an alkyldimethylamine oxide compound having a structure represented by the above formula (1) or a methylmorpholine oxide compound is added to the reaction solution to grow particles of rare earth carbonate fine particles, growth of the particles is suppressed during particle growth process, then, it is understood that rare earth carbonate particles of submicron or less and an average particle diameter of 10 nm to 200 nm having excellent dispersibility can be produced with good controllability.

On the other hand, in Comparative Example 1, since the amount of the compound having the structure represented by the formula (1) added was small, the effect of suppressing the particle growth in the particle growth process was low, and the particles having an average particle diameter of 200 nm or less were not obtained. Further, in Comparative Example 2, since the amount of the compound having the structure represented by the formula (1) added was large, the particle growth reaction did not proceed on the contrary, and the obtained particles were nano-sized fine particles and an average particle size of less than 10 nm.

In Comparative Examples 4 and 5, which were examples in which a compound different from the alkyldimethylamine oxide compound having a structure represented by the above formula (1) and the methylmorpholine oxide compound were added, the effect of suppressing particle growth was not obtained. Therefore, it was not possible to obtain particles having an average particle diameter of 200 nm or less.

As described above, rare earth carbonate fine particles having particle size of submicron or less and an average particle diameter of 10 nm to 200 nm having excellent dispersibility can be manufactured stably with high controllability by hydrothermally treating the reaction solution comprising the rare earth ion, the excess amount of urea with respect to the rare earth ion, and a predetermined amount of the alkyldimethylamine oxide compound having the structure represented by the above formula (1) or methylmorpholine oxide compound.

It should be noted that the present invention is not limited to the above-described embodiments. The embodiments are just examples, and any examples that substantially have the same feature and demonstrate the same functions and effects as those in the technical concept disclosed in claims of the present invention are included in the technical scope of the present invention.

The invention claimed is:

1. A method for producing rare earth carbonate fine particles, comprising:
    forming a reaction solution in which an alkyldimethylamine oxide compound having a structure represented by the following formula (1) or a methylmorpholine oxide compound is added to an aqueous solution containing rare earth ion and an excess amount of urea in molar concentration with respect to the rare earth ion, such that the compound is added in an addition amount of 10 to 200 mol % relative to the rare earth ion; and
    subjecting the reaction solution to hydrothermal treatment to produce rare earth carbonate fine particles:

[Chemical formula 1]

(1)

wherein R represents an alkyl group of C1 to C14, and wherein the rare earth carbonate fine particles have a submicron or less particle size.

2. The method for producing rare earth carbonate fine particles according to claim 1, wherein the rare earth carbonate fine particles are cerium or a composite particle of cerium and another rare earth element.

3. The method for producing rare earth carbonate fine particles according to claim 1, wherein average particle size of the rare earth carbonate fine particles is 10 nm to 200 nm.

4. The method for producing rare earth carbonate fine particles according to claim 2, wherein average particle size of the rare earth carbonate fine particles is 10 nm to 200 nm.

5. A rare earth carbonate fine particle wherein average particle size is 10 nm to 200 nm, and
    an alkyldimethylamine oxide compound having a structure represented by the following formula (1) or a methylmorpholine oxide compound is adsorbed on a surface of the rare earth carbonate fine particle:

[Chemical formula 2]

(1)

wherein R represents an alkyl group of C1 to C14.

6. The rare earth carbonate fine particle according to claim 5, wherein the rare earth carbonate fine particle is cerium or a composite particle of cerium and another rare earth element.

* * * * *